(12) United States Patent
Ohtomo et al.

(10) Patent No.: US 7,214,917 B2
(45) Date of Patent: May 8, 2007

(54) ROTATING POSITION MEASURING INSTRUMENT

(75) Inventors: Fumio Ohtomo, Tokyo (JP); Akio Kimura, Tokyo (JP)

(73) Assignee: Kabushiki Kaisha Topcon, Tokyo (JP)

( * ) Notice: Subject to any disclaimer, the term of this patent is extended or adjusted under 35 U.S.C. 154(b) by 0 days.

(21) Appl. No.: 10/320,235

(22) Filed: Dec. 16, 2002

(65) Prior Publication Data
US 2003/0141466 A1    Jul. 31, 2003

(30) Foreign Application Priority Data
Dec. 18, 2001    (JP) .............................. 2001-385329

(51) Int. Cl.
  G01C 21/02    (2006.01)
  G01C 3/08     (2006.01)
  G01B 11/26    (2006.01)
(52) U.S. Cl. ................ 250/206.1; 356/4.01; 356/141.1
(58) Field of Classification Search ............ 250/206.1, 250/236; 356/4.08, 139.07, 4.01, 141.1
See application file for complete search history.

(56) References Cited

U.S. PATENT DOCUMENTS 6,011,613 A * 1/2000 Ohtomo et al. ............ 356/4.08
6,556,598 B1 * 4/2003 Angott ......................... 372/9

* cited by examiner

*Primary Examiner*—Thanh X. Luu
(74) *Attorney, Agent, or Firm*—Baker Botts L.L.P.

(57) ABSTRACT

A position measuring instrument according to the present invention comprises a turning unit and a fixed unit, irradiates a target to be measured with measuring light to determine a distance, a direction, and a position on the basis of its reflected light. A light source unit emits measuring light; a light receiving unit receives its reflected light; a radiating means radiates measuring light in a direction which can be set freely, and directs its reflected light to the light receiving unit; an angle detecting means detects a direction in which the radiating means radiates light; the light source unit and the light receiving unit are fixedly provided; the light source unit emits measuring light toward the radiating means; and the light receiving unit receives reflected light from the target to be measured.

2 Claims, 5 Drawing Sheets

ROTATING POSITION MEASURING INSTRUMENT

BACKGROUND OF THE INVENTION

The present invention relates to a position measuring instrument comprising a turning unit and a fixed unit, in which a rotating unit has a reflection member and a slant measuring unit can detect a backlash of the turning unit to correct the backlash.

Conventionally, an automatic tracking total station which is made by automating a total station is known in the instrument that automatically measures a position of a target to be measured. The automatic tracking total station is so devised that a direction of collimation of a lens barrel can rotate up and down, and right and left, by driving force of a motor. Rotation angles of horizontal rotation and vertical rotation are detected using the output of an encoder as an angle measuring means.

Not only a collimation telescope and a distance measuring means, which are included in an ordinary total station, but also a tracking means for detecting a prism reflector placed on a measurement position are built into the lens barrel.

Besides them, a main body of the automatic tracking total station is provided with a tilt sensor for detecting inclination of a frame, various kinds of electronic processing circuits, an indicator, a battery and the like.

FIG. 5 is a partial sectional view of the automatic tracking total station.

A surveying-instrument main body 1000 comprises the following: a lens barrel 1100 that is provided in such a manner as to rotate vertically; a frame 1200 that supports the lens barrel 1100 so that it can rotate vertically; a base 1300 that supports the frame 1200 so that it can rotate horizontally; and a leveling unit 1400 having a leveling function, which is placed under the base 1300.

The frame 1200 is provided with a horizontal rotation mechanism 1710 that rotates the frame 1200 horizontally about a vertical axis through a horizontal rotation drive gear 1711 using a horizontal rotation motor 1712, and a vertical rotation mechanism 1740 that rotates the lens barrel 1100 vertically about a horizontal axis through a vertical rotation drive gear 1741 using a vertical rotation motor 1742.

A horizontal rotation-angle detecting encoder 1730 is attached to a horizontal rotation axis 1720, and an angular-height detecting encoder 1760 is attached to a vertical rotation axis 1750, so that they detect respective rotation angles.

The automatic tracking total station is basically made by remodeling a surveying instrument of the manually operated total station type so that the surveying instrument can be driven by a motor. An automatic tracking device is a device which is automated so that the device requires no operator. However, a collimation telescope, a distance measuring means, a tracking means, and the like, are built into a lens barrel.

Therefore, the automatic tracking device becomes large and heavy. In a similar manner, not only the lens barrel but also a drive unit for vertical and horizontal rotation are built into the frame that supports the lens barrel and that rotates horizontally. This makes a turning unit large and heavy.

For reasons of its use, the surveying instrument is so devised that the lens barrel rotates in a vertical direction, and that the frame rotates in a horizontal direction with a telescope unit.

The torque required when accelerating a rotating unit from a stopped state can be expressed in an equation below.

$$T = I * d\omega/dt \qquad \text{First Equation}$$

where T is torque, I is moment of inertia of a rotation system, and $d\omega/dt$ is angular acceleration.

This first equation shows that the torque is proportional to the angular acceleration and the moment of inertia.

Since the surveying instrument is a measuring instrument that is generally used outdoors, a battery is usually used as its power supply. Therefore, power consumption of a motor is required to be minimized. This means that it is necessary to use a small-size motor for this purpose. As a result, the torque T which can be generated by the small-size motor is naturally limited.

On the other hand, as for the automatic tracking total station, it is necessary to build a motor into a part corresponding to vertical and horizontal rotation axes to rotate a telescope unit and a frame so that the telescope is quickly directed toward a direction of the prism which is a target to be measured. Further, if the automatic tracking total station measures a prism as a moving target to be measured while tracking the prism, an improvement in follow-up properties is particularly required.

In both of the cases, that is to say, increasing the speed of rotation, and increasing the follow-up properties., performance in acceleration and deceleration of a rotating unit becomes important in particular. When considering how to improve the performance in acceleration and deceleration, using a large motor to improve the torque T is a simple and easy method. However, as described above, this method causes an increase in power consumption and an increase in weight of the motor. After all, this method is not a wise policy.

As shown in the first equation, if the torque T is fixed, and if an increase in angular acceleration is required, it is necessary to reduce the moment of inertia I. The moment of inertia I is proportional to mass of the rotating unit, and is proportional to the square of a turning radius.

Accordingly, if a decrease in moment of inertia I is required, decreasing the mass and turning radius of the rotating unit suffices. This means that even if the torque T is small, performance in rotation can be improved.

As described above, the conventional surveying instrument is so devised that the whole lens barrel or the whole frame rotates. As a result, many component parts are built into these parts. Therefore, the structure of the conventional surveying instrument poses the problem that it is difficult to improve the performance in acceleration and deceleration.

SUMMMARY OF THE INVENTION

According to one aspect of the present invention, there is provided a position measuring which comprises a turning unit and a fixed unit, and which irradiates a target to be measured with measuring light to determine a distance, a direction, and a position on the basis of light reflected from the target to be measured, wherein a light source unit emits measuring light; a light receiving unit receives its reflected light; a radiating means radiates measuring light in a direction which can be set freely, and directs its reflected light to the light receiving unit; an angle detecting means detects a direction in which the radiating means radiates light; the light source unit and the light receiving unit are secured; the light source unit emits measuring light toward the radiating means; and the light receiving unit receives reflected light from the target to be measured.

BRIEF DESCRIPTION OF THE DRAWINGS

Other objects and advantages of the invention will become apparent from the following description of embodiments with reference to the accompanying drawings in which.

DETAILED DESCRIPTION OF THE PREFERRED EMBODIMENTS

Embodiments of the present invention will be described with reference to drawings below.

Figure 1:
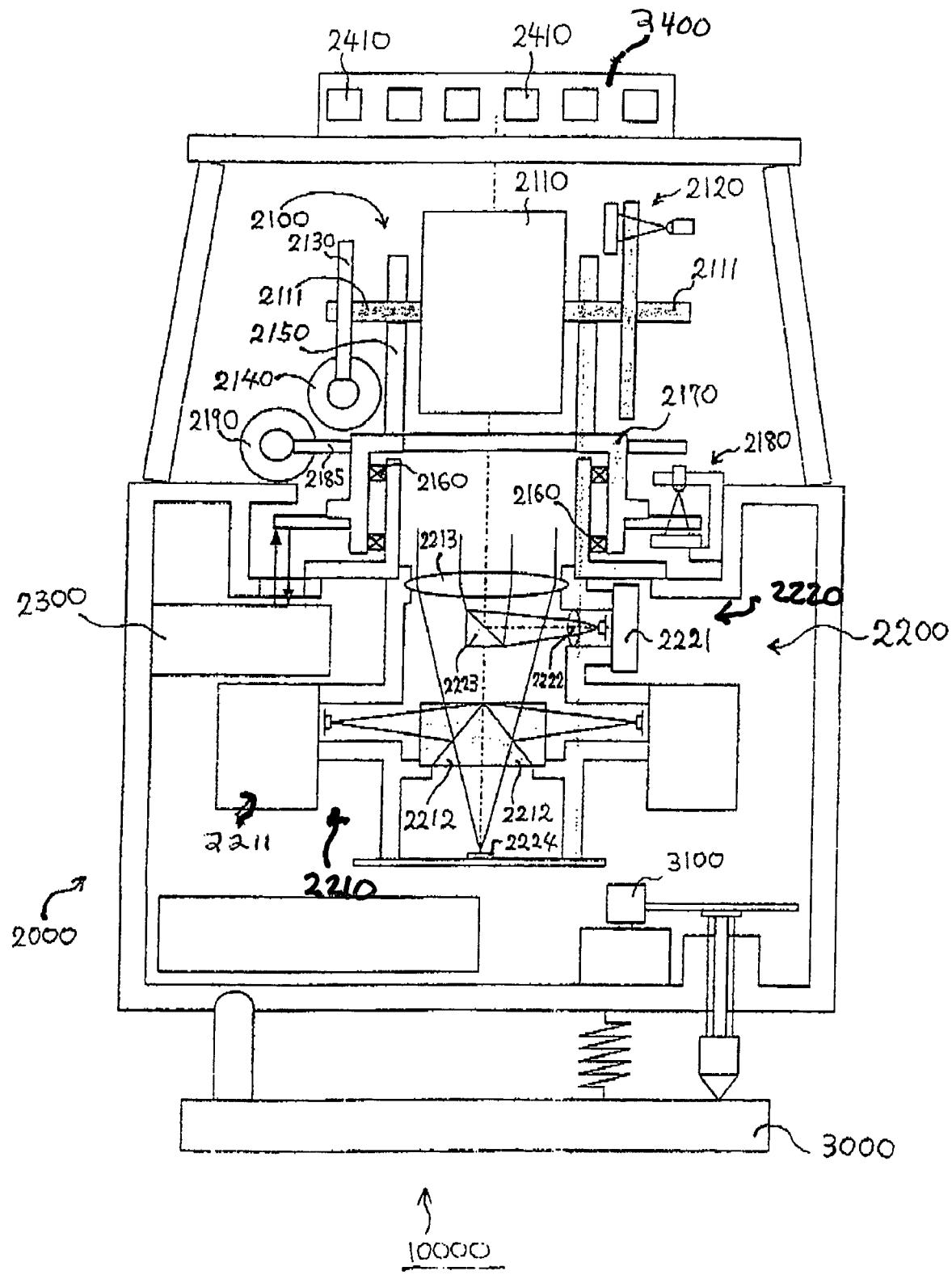
FIG. 1 is a diagram illustrating a surveying instrument according to an embodiment of the present invention.
Figure 2:
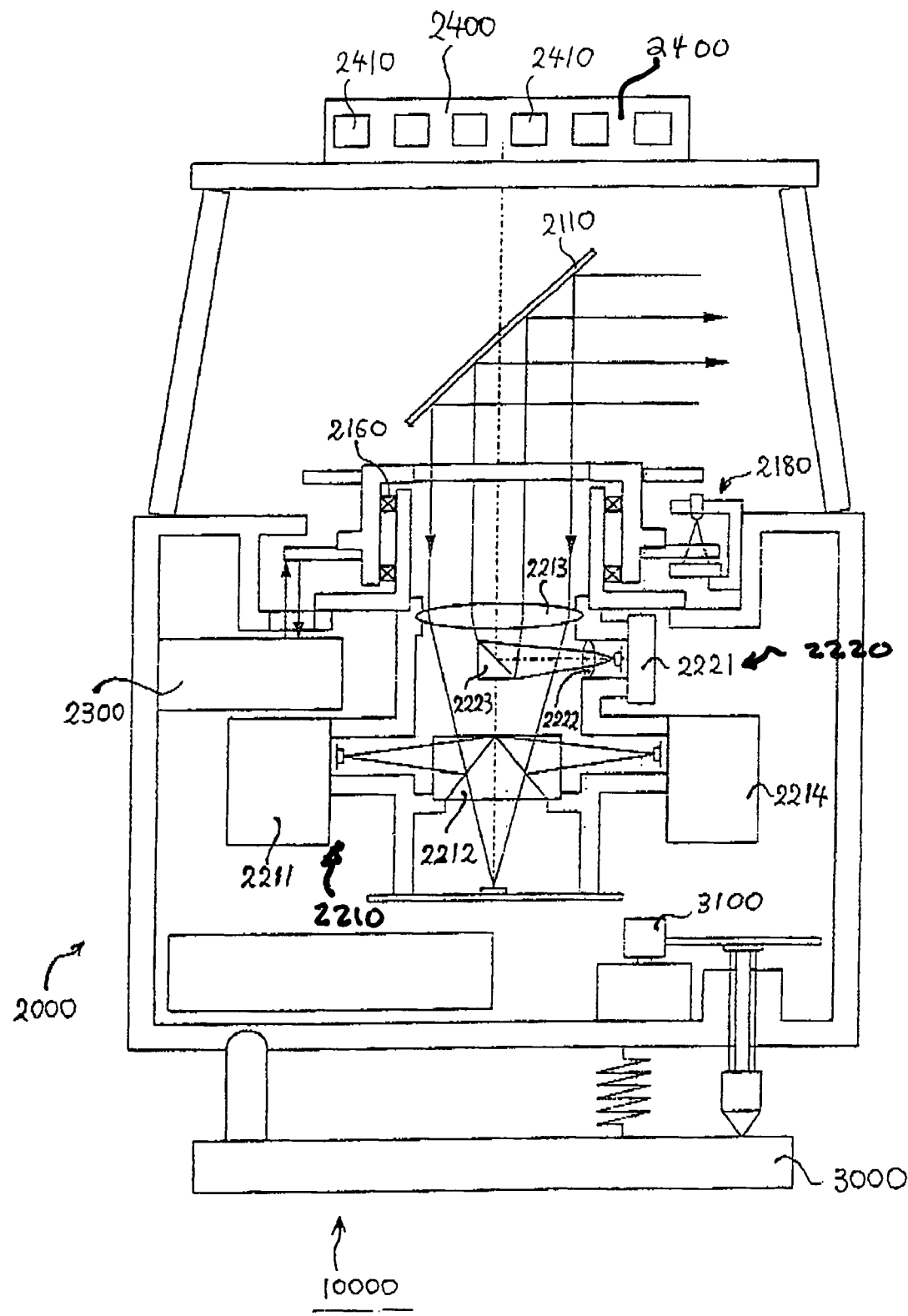
FIG. 2 is a diagram illustrating the surveying instrument according to the embodiment.

A surveying instrument 10000 according to this embodiment will be described with reference to FIGS. 1 and 2.

The surveying instrument 10000 consists of a surveying-instrument main body 2000 and a leveling unit 3000.

The surveying-instrument main body 2000 comprises a rotating unit 2100, a fixed unit 2200, a slant measuring unit 2300, and an arrival-direction detecting unit 2400.

The rotating unit 2100 corresponds to a turning unit. The rotating unit 2100 comprises a rotating unit in a vertical direction (vertical turning unit) and a rotating unit in a horizontal direction (horizontal turning unit).

The vertical rotating unit (vertical turning unit) is used to rotate a rotating mirror 2110 in a vertical direction (angular height). Horizontal axes 2111, 2111 are provided at the respective ends of the rotating mirror 2110. A rotary encoder 2120 used for measuring an angular height is attached to one of the horizontal axes 2111; and a vertical drive motor 2140 is coupled to the other horizontal axis 2111 through a first drive gear 2130. Since the vertical drive motor 2140 is secured to a support 2150, the vertical rotating unit rotates as one body by driving force of the vertical drive motor 2140.

In this connection, the rotating mirror 2110 corresponds to a reflection member.

The horizontal rotating unit (horizontal turning unit) is used to rotate the rotating mirror 2110 in a horizontal direction. The horizontal rotating unit comprises the following: a vertical axis 2170; a support 2150 connected onto the vertical axis 2170; and a horizontal axis 2111 connected to the rotating mirror 2110 that is secured to the support 2150. The horizontal rotating unit is configured to rotate as one body.

In addition, a rotary encoder 2180 used for measuring a horizontal angle is mounted to the vertical axis 2170. Moreover, a horizontal drive motor 2190 is connected to the vertical axis 2170 through a second drive gear 2185. Since the horizontal drive motor 2190 is secured to a housing, driving force of the horizontal drive motor 2190 causes the rotating unit 2100 which includes the vertical axis 2170 to rotate in a horizontal direction.

It is to be noted that the rotary encoder 2120 used for measuring an angular height and the rotary encoder 2180 used for measuring a horizontal angle correspond to an angle detecting means.

Positions on the inside of the vertical axis 2170 are secured to the housing through bearings 2160. Under the vertical axis 2170, a distance measuring unit 2210 and a prism detecting unit 2220, which are each an optical system, are provided.

In the distance measuring unit 2210, distance measuring light emitted from a distance detection light-emitting unit 2211 is reflected by a dichroic prism 2212. Then, the distance measuring light passes through an objective lens 2213 before it is reflected by the rotating mirror 2110. After that, the distance measuring light is emitted in a direction of a prism to be measured (target to be measured), which is not illustrated. The reflected light coming from the prism to be measured, through a reverse path, is received by a light receiving element of a distance-detection light receiving unit 2214.

The prism detecting unit 2220 is used for detecting a prism to be measured. Distance measuring light emitted from a prism detection light-emitting unit 2221 passes through a condenser lens 2222, a small mirror 2223, and an objective lens 2213, and is then reflected by the rotating mirror 2110. After that, the distance measuring light is emitted in a direction of the prism to be measured (target to be measured), which is not illustrated. Reflected light from the prism to be measured is reflected by the rotating mirror 2110, and is then condensed by the objective lens 2213. The condensed light passes through the dichroic prism 2212 before it is received by a light receiving element of the prism detection light receiving unit 2224.

The leveling unit 3000 has a structure that basically supports the surveying-instrument main body 2000 using three legs. One of the three legs has a spherical surface, for example, so as to support the main body 2000 for turning. The others can move up and down by driving force of a leveling drive motor 3100. Adjusting the up-and-down motion permits the surveying-instrument main body 2000 to be leveled. The leveling is performed on the basis of the output of the slant measuring unit. A spring supports a base below it. The base serves to mount heads of the three legs. It is to be noted that the leveling unit 3000 can also be built into the surveying-instrument main body 2000 so as to level an internal constituent member directly.

Figure 4:
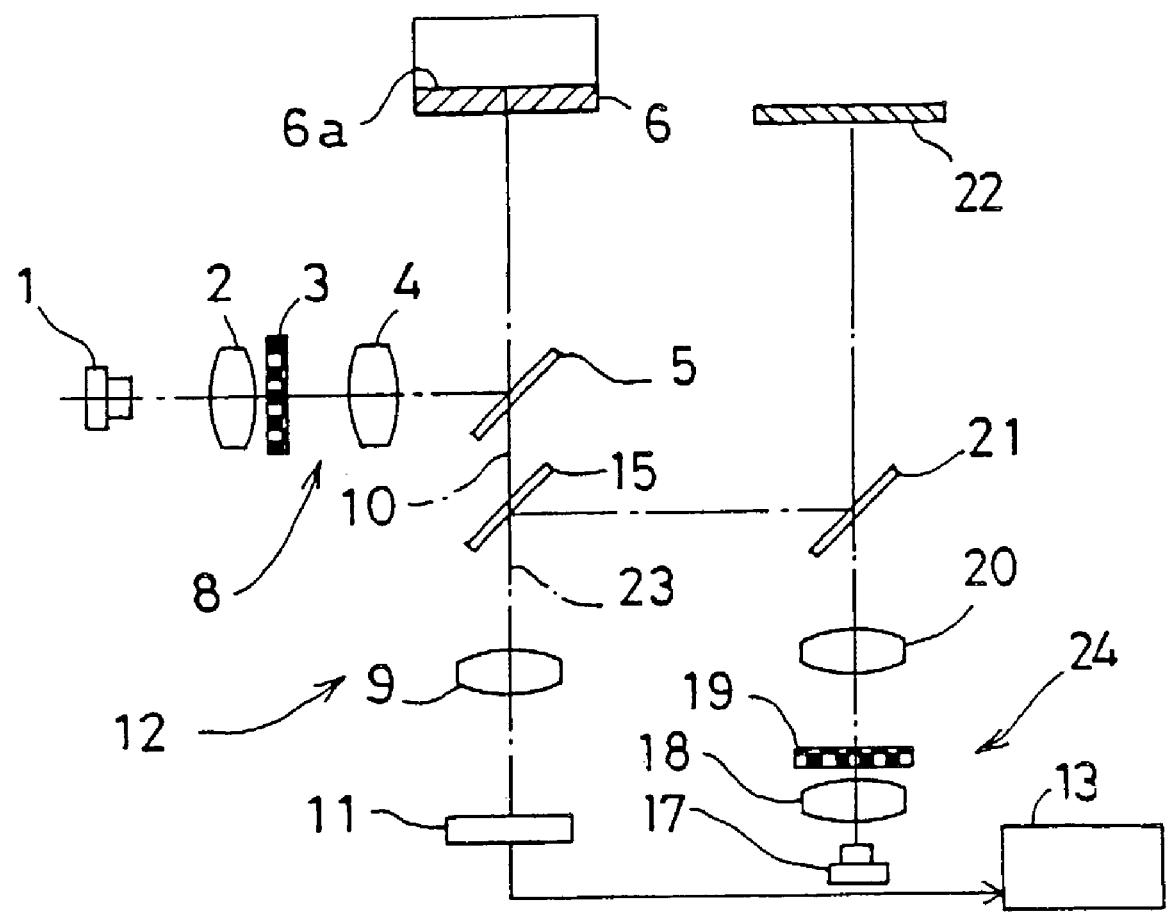
FIG. 4 is a diagram illustrating a slant measuring unit according to the embodiment.
Figure 5:
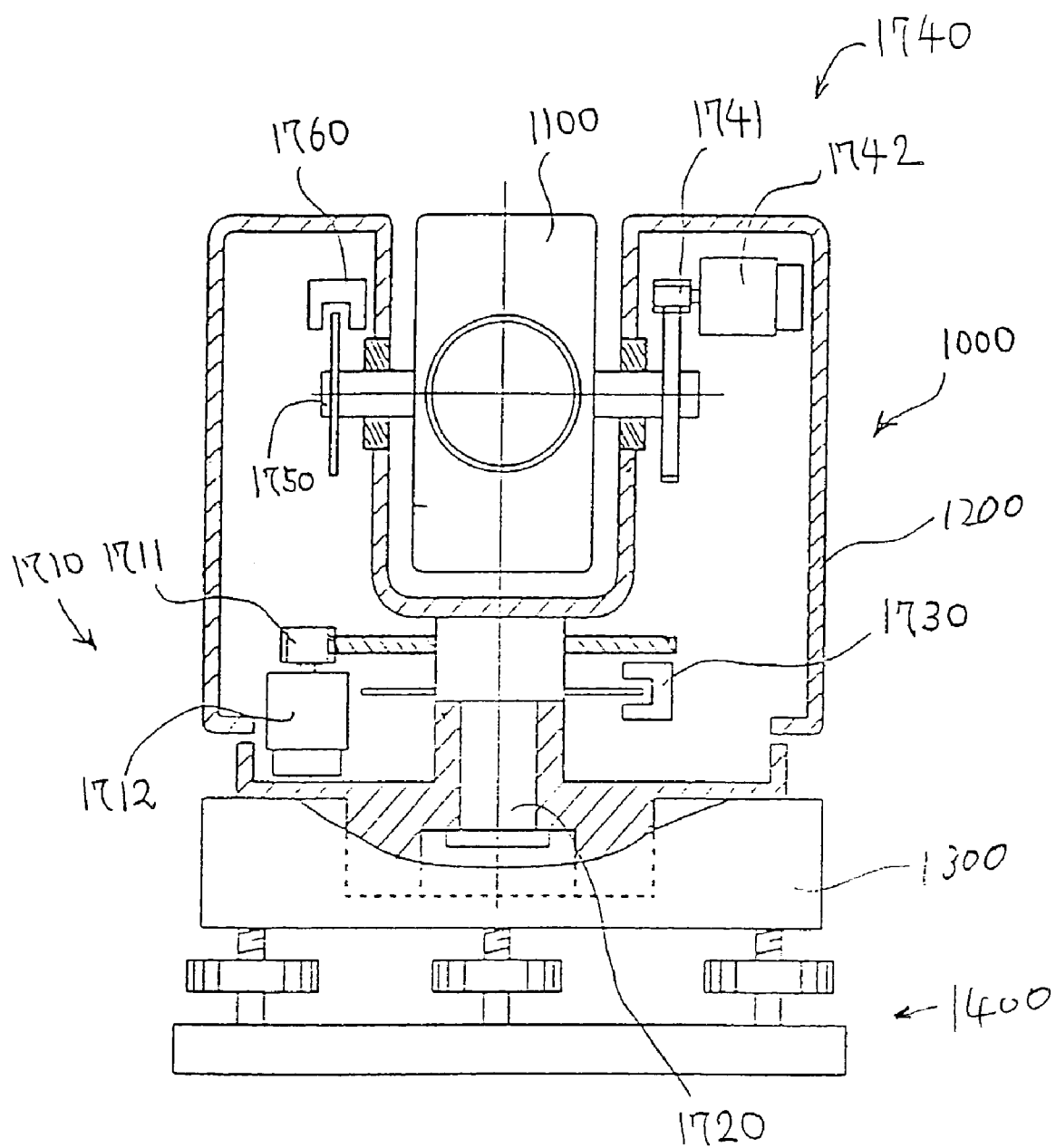
FIG. 5 is a diagram illustrating the prior art.

The slant measuring unit 2300 will be described with reference to FIG. 4.

The slant measuring unit 2300 detects a slant of the surveying-instrument main body 2000, and thereby horizontally levels the surveying-instrument main body 2000 using the slant as a control signal of the leveling unit 3000. In addition to it, an inclination of the rotating unit 2100 is detected by detecting an inclination of an encoder, which is provided in such a manner that the encoder and the vertical axis 2170 which is perpendicular to a horizontal direction form one body. A measured value, a distance value, and a position value are corrected according to the detected inclination.

The slant measuring unit 2300 comprises a first light source 1, a first condensing lens 2, a first pattern 3, a second condensing lens 4, and a first half mirror 5. The slant measuring unit 2300 constitutes a free fluid level light-projecting system 8.

A light beam reflected by the first half mirror 5 is reflected by the free fluid level 6a, and then passes through the first half mirror 5. A second half mirror 15, a third condensing lens 9, and a light receiving means 11 are placed on a transmitted light axis 10 of the first half mirror 5. For example, a CCD area sensor is used as the light receiving means 11.

A second light source 17 which has a projected light axis parallel to the transmitted light axis 10 of the first half mirror 5 is placed. On a projected light axis of the second light source 17, a fourth condensing lens 18, a second pattern 19, a fifth condensing lens 20, and a third half mirror 21 are placed. The third half mirror 21 faces the second half mirror 15.

On a transmitted light axis of the third half mirror 21, a reflection member 22 (horizontal encoder) is placed at a position which is perpendicular to the transmitted light axis. The reflection member 22 utilizes a surface of the horizontal encoder as a reflection plane. The horizontal encoder is mounted in such a manner that the horizontal encoder and the vertical axis 2170 of the rotating unit 2100 form one body. Moreover, the rotating unit 2100 is supported by the vertical axis 2170, which is mounted to the cabinet of the surveying-instrument main body 2000, so that the rotating unit 2100 can rotate horizontally. In addition to it, the rotating unit 2100 is mounted so that when the slant measuring unit 2300 is appropriately installed so as to become horizontal, a reflection plane of the reflection member 22 also becomes approximate horizontal.

The second light source 17, the fourth condensing lens 18, the second pattern 19, the fifth condensing lens 20, the third half mirror the 21 and the like constitute a fixed reflection member light-projecting system 24. The first half mirror 5, the second half mirror 15, the third half mirror 21, the third condensing lens 9, the light receiving means 11 and the like constitute a light receiving optical system 12.

Thus, a light beam emitted from the first light source 1 is condensed by the first condensing lens 2 so that the light beam becomes an approximately parallel luminous flux. After passing through the first pattern 3 and the second condensing lens 4, the light beam is reflected by the first half mirror 5, and is further reflected by the free fluid level 6a. Then, the light beam passes through the first half mirror 5, the second half mirror 15, and the third the condensing lens 9 before the light beam is received by the light receiving means 11. To be more specific, a first pattern image 3a (not illustrated) of the first pattern 3 is formed on the light receiving means 11 by the third condensing lens 9.

In addition, a light beam emitted from the second light source 17 is condensed by the fourth condensing lens 18 so that the light beam becomes an approximately parallel luminous flux. Then, the light beam passes through the second pattern 19, and also passes through the fifth condensing lens 20 and the third half mirror 21. After that, the light beam is reflected by the reflection member 22, and further reflected by the third half mirror 21 and the second half mirror 15 before it is received by the light receiving means 11 through the third condensing lens 9. To be more specific, a second pattern image 19a (not illustrated) of the second pattern 19 is formed on the light receiving means 11 through the third condensing lens 9.

In this connection, the reflected light axis 23 in a state in which the second half mirror 15 reflects the light reflected from the reflection member 22 is coincident with the transmitted light axis 10 if the transmitted light axis 10 is vertical. Accordingly, the first pattern image 3a of the first pattern 3 is coincident with the second pattern image 19a of the second pattern 19.

The transmitted light axis 10 is given when the free fluid level 6a reflects a light beam. Accordingly, if a slant detector itself slants, the free fluid level 6a of the liquid member 6 slants relative to the slant detector its-elf. As a result, the reflected light axis 23 declines relative to an incident light axis.

As described above, if the free fluid level 6a slants by θ, the reflected light axis declines by 2nθ—where a refractive index of a liquid member 6 is n. Accordingly, on the light receiving means 11, the first pattern image 3a shifts by f*tan(2nθ) from a reference position.

On the other hand, a projected light axis of the reflection member light-projecting system 24 is vertically fixed if the surveying-instrument main body 2000 is horizontally leveled. In addition, if the horizontal encoder which is the reflection member 22 has no backlash and no slant, and rotates horizontally, a light receiving position (position of the second pattern image 19a) of a light beam, which is reflected by the reflection member 22, in the light receiving means 11 is kept constant.

On the contrary, if the horizontal encoder which is the reflection member 22 has a rotation backlash and an inclination, it is detected as a shifting distance L of the second pattern image 19a relative to the first pattern image 3a. It is possible to detect a slant direction by detecting a direction of the second pattern image 19a relative to the first pattern 3a of the light receiving means 11.

In the processing means 4000, a deviation of the first pattern image 3a from the second pattern image 19a is determined on the basis of a light receiving signal from the light receiving means 11. Further, the slant quantity and a slant direction are calculated on the basis of the deviation.

Incidentally, the first pattern image 3a and the second pattern image 19a in the light receiving optical system 12 are used to detect a relative shifting distance of an image from a horizontal state. Therefore, in a state in which the slant measuring unit 2300 itself is horizontal, the reflected light axis 23 from the reflection member 22 and the reflected light axis 23 from the free fluid level 6a are not necessarily coincident with each other, or are not necessarily parallel to each other. Moreover, the first pattern image 3a and the second pattern image 19a are not necessarily coincident with each other on the light receiving means 11 in a state in which the slant measuring unit 2300 itself is horizontal. The amount of deviation between both images may be used as a correction value at the time of calculation.

The arrival-direction detecting unit 2400 is used to detect an arrival direction approximately. If an operator at a target measurement point emits modulated light having a specific frequency toward the surveying-instrument main body 2000, an arrival-direction detection light receiving unit 2410 of the arrival-direction detecting unit 2400 receives the modulated light, and thereby detects an approximate arrival direction.

The arrival-direction detecting unit 2400 comprises the arrival-direction detection light receiving unit 2410 and an arrival-direction detecting circuit 2420. The arrival-direction detection light receiving units 2410 are placed on the circumference so that they face in a plurality of directions to detect arrival light from a horizontal direction. The arrival-direction detecting circuit 2420 is so devised that it compares the quantity of received light among the plurality of arrival-direction detection light receiving units 2410 to determine a direction.

Figure 3:
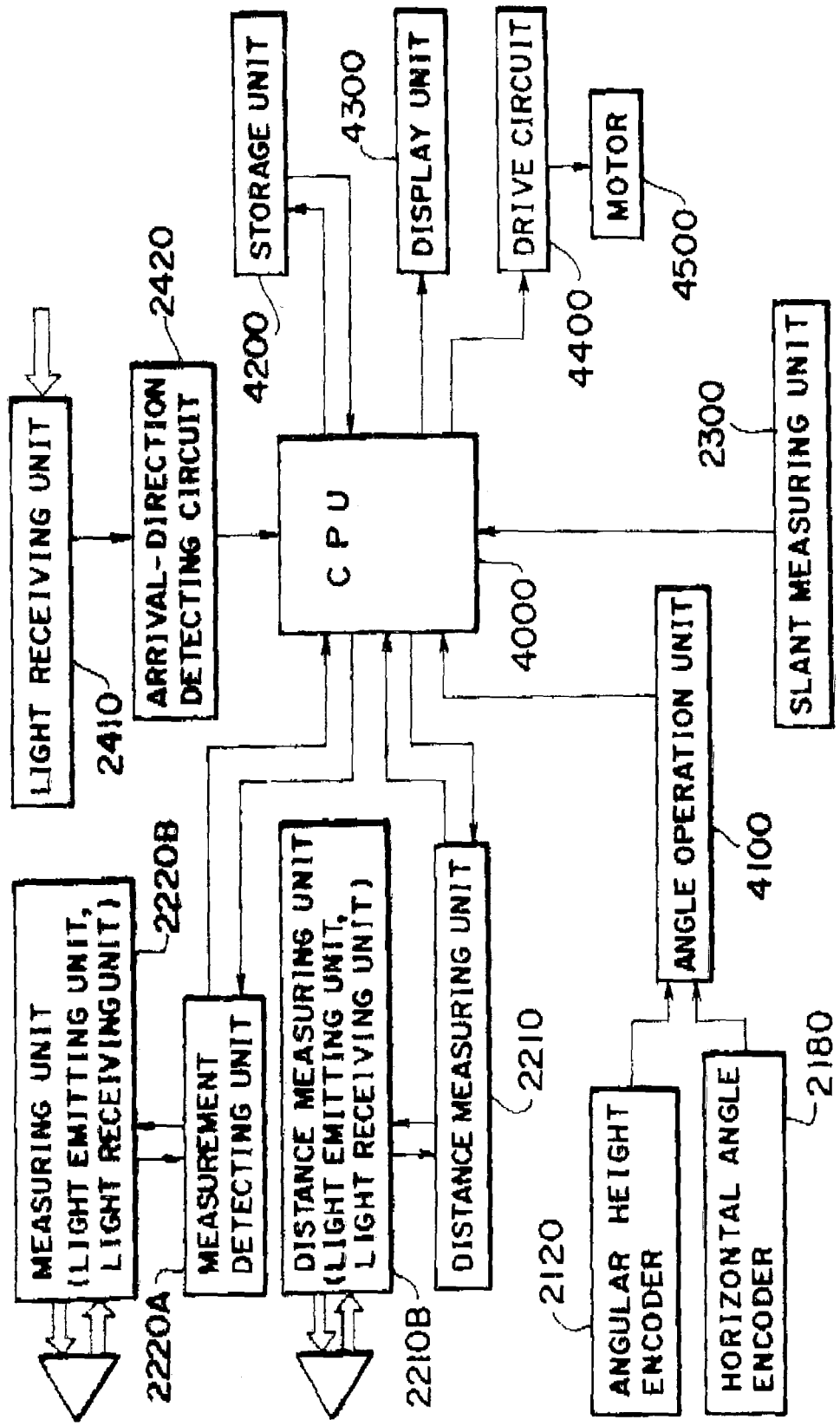
FIG. 3 is a diagram illustrating an electric configuration of the surveying instrument according to the embodiment.

Next, an electric configuration of the surveying instrument 10000 according to this embodiment will be described with reference to FIG. 3.

The surveying instrument 10000 comprises the following: the distance measuring unit 2210; a distance measuring unit 2210B comprising the distance detection light-emitting unit 2211 and the distance-detection light receiving unit 2214; a measurement detecting unit 2220A which corresponds to the prism detecting unit 2220; a measuring unit 2220B comprising the prism detection light-emitting unit 2221 and the prism detection light receiving unit 2224; the rotary encoder 2120 used for measuring an angular height and the rotary encoder 2180 used for measuring a horizontal angle; an angle operation unit 4100; the slant measuring unit 2300; the arrival-direction detection light receiving unit 2410; the arrival-direction detecting circuit 2420; a storage unit 4200; a display unit 4300; a drive circuit 4400; a motor 4500; and the processing means 4000.

The motor 4500 corresponds to the vertical drive motor 2140 and the horizontal drive motor 2190.

In the surveying instrument 10000 that is configured as above, the measuring unit 2220B emits measuring light toward a target to be measured, and receives its reflected light. The measurement detecting unit 2220A generates a signal for detecting the target to be measured. On the basis of detection signals by the rotary encoder 2120 used for measuring an-angular height and the rotary encoder 2180 used for measuring a horizontal angle, the angle operation unit 4100 detects an angle of rotation, and the processing means 4000 drives the motor 4500 using the drive circuit 4400 so that the surveying instrument 10000 faces or tracks the target to be measured.

In addition, the distance measuring unit 2210 calculates a distance between the surveying instrument 10000 and the target to be measured.

Further, the slant measuring unit 2300 detects a rotation backlash, and an inclination, of the rotating unit 2100 caused by the accuracy in rotation of bearings; and the processing means 4000 corrects a light receiving position of the target to be measured, at which the light receiving unit receives light. As a result, the influence of the rotation backlash and the inclination can be eliminated.

In this embodiment that is configured as above, in general, moving units for probing and tracking are united in the rotating mirror 2110; there is no lens barrel and no frame; and the turning unit consists of the rotating mirror 2110 and the rotary encoder 2120 used for measuring an angular height. The distance measuring unit 2210 and the measuring unit 2220B are fixedly mounted on the side of the surveying-instrument main body 2000.

The rotating unit 2100 can be configured with the fewest possible parts required to emit light in the direction of a prism to be measured (target to be measured), and to direct reflected light from the prism to be measured (a target to be measured) to each light receiving unit through the objective lens 2213. As a result, the weight and the radius of rotation of the rotating unit 2100 can be reduced, causing the moment of inertia to be minimized. Accordingly, it is possible to realize high-speed probing and tracking using a small motor with low power consumption.

According to one aspect of the present invention, there is provided a position measuring instrument that irradiates a target to be measured with measuring light to determine a distance, a direction, and a position on the basis of light reflected from the target to be measured, wherein: a light source unit emits measuring light; a light receiving unit receives its reflected light; a radiating means radiates measuring light in a direction which can be set freely, and directs its reflected light to the light receiving unit; an angle detecting means detects a direction in which the radiating means radiates light; the light source unit and the light receiving unit are fixedly provided; the light source unit emits measuring light toward the radiating means; and the light receiving unit receives reflected light from the target to be measured. As a result, the weight and the radius of rotation of the rotating unit are reduced, causing the moment of inertia to be minimized. Accordingly, it is possible to realize high-speed probing and tracking using a small motor with low power consumption, which is an excellent effect.

What is claimed is:

1. A position measuring instrument capable of irradiating a target with measuring light to determine a distance, a direction, and a position of the target on the basis of light reflected from the target, the position measuring instrument having a rotating unit and a fixed unit, and comprising:
   a light source unit for emitting measuring light; and
   a light receiving unit for receiving reflected light; and
   wherein said rotating unit comprises:
   a reflecting mirror capable of reflecting in at least a vertical and horizontal direction;
   a vertical driving motor for driving the reflecting mirror up and down;
   a horizontal driving motor for driving the reflecting mirror side to side;
   a rotary encoder for measuring a vertical rotating angle of said reflecting mirror; and
   a rotary encoder for measuring a horizontal rotating angle of said reflecting mirror;
   and further comprising a distance measuring unit for measuring a distance from the position measuring instrument to the target, and a slant measuring unit for correcting a position of said target based on a measurement of an inclination of the rotating unit and a measurement of a rotational backlash of the rotating unit.

2. A position measuring instrument according to claim 1, further comprising an arrival-direction detecting light receiving unit arranged circumferentially so as to be capable of detecting light emitted from a horizontal direction.

\* \* \* \* \*